INVENTOR.
ANTHONY W. MERCHLEWITZ
BY
James V. Harmon
ATTORNEY

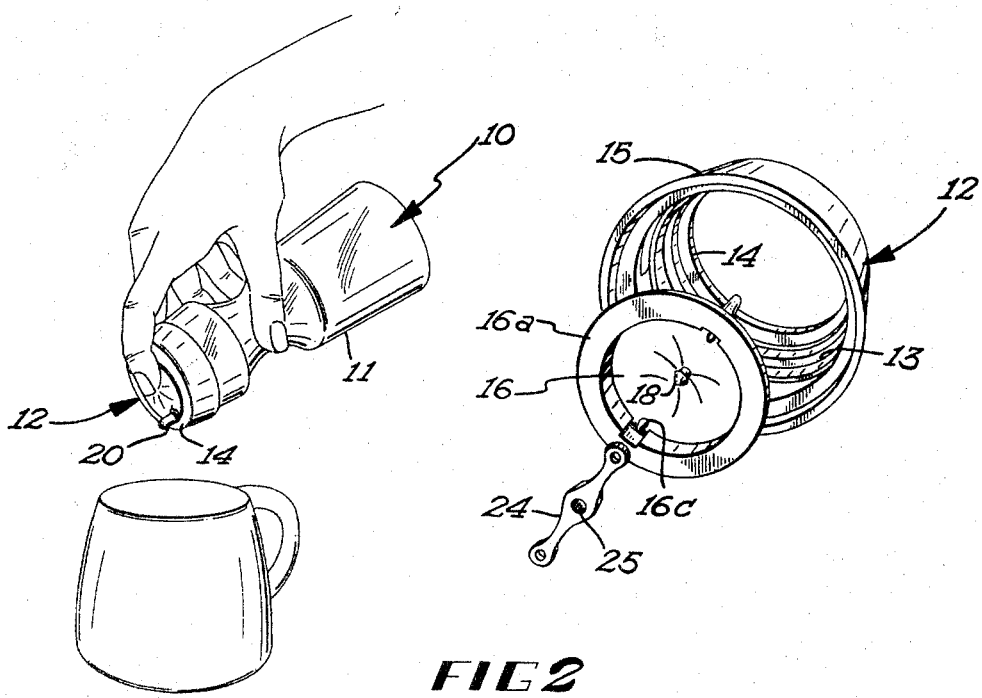
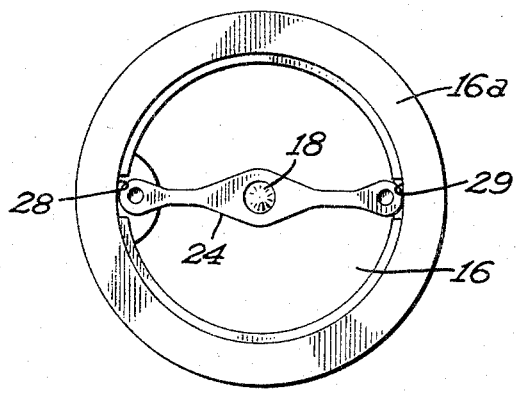
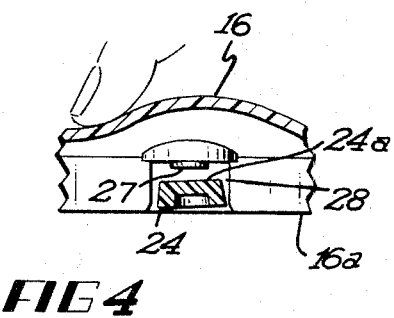

United States Patent Office 3,434,631
Patented Mar. 25, 1969

3,434,631
LIQUID DISPENSING CONTAINER AND CAP THEREFOR
Anthony W. Merchlewitz, Minneapolis, Minn., assignor to The Pillsbury Company, Minneapolis, Minn., a corporation of Delaware
Filed May 3, 1967, Ser. No. 635,908
Int. Cl. B65d 25/52
U.S. Cl. 222—213
7 Claims

ABSTRACT OF THE DISCLOSURE

A liquid dispensing container and cap for such containers composed of a flexible resilient diaphragm sealed along its edge to the top of the container body. A dispensing duct is provided on one side of the diaphragm. A valve sealing arm is connected to the center of the diaphragm and is positioned immediately below it. One end of the arm overlaps the inward end of the duct until the center of the diaphragm is depressed with the finger.

---

The present invention relates to a dispensing container and cap therefor and more particularly to a container and cap for dispensing a liquid in quantities of from one to several drops at one time.

A variety of liquid dispensing containers have been previously proposed. Many of these containers have been to some extent ineffective in operation in addition to being expensive to produce.

One problem encountered in containers of the type described is that small quantities of liquid can become trapped in the dispensing outlet. This trapped liquid has a tendency to bubble from the outlet when the temperature of the air within the container increases. It is particularly objectionable when the container is used for storing and dispensing a liquid containing dissolved solids such as an artificial sweetener since the dissolved solids form an unsightly deposit around the nozzle.

Another shortcoming encountered in the prior art is the tendency for the container to expel a surge of liquid from the dispensing nozzle when inverted.

United States Patent No. 3,323,692 (Ser. No. 501,584) describes a dispensing cap including a flexible dome with an integral dispensing duct on one side and a movable valve sealing element supported at its edges between the cap and the rim of a container to which the cap is secured. The valve element is adapted to be engaged by the dome when the dome is pressed downwardly. Continued movement of the dome moves the valve element out of sealing engagement with the inward end of the dispensing duct. This container although highly satisfactory has certain deficiencies. There is, for example, a tendency for the valve element to rotate relative to the dome as the cap is tightened on the container during its last few degrees of rotation. When this occurs, the portion of the movable valve element that is intended to seal the lower end of the dispensing duct is often displaced a sufficient distance to permit leakage through the dispensing duct.

The valve sealing element in this container also has a tendency to assume a normal resting position spaced slightly from the inward end of the dispensing duct. When this occurs it is possible for small amounts of liquid to be dispensed even though the dome is not depressed. Moreover, in the patented construction there are two possible sealing zones in which leakage can occur; namely, the seal between the dome and the valve sealing element and the seal between the valve sealing element and the rim of the jar. In the prior construction, the assembly of parts is to some extent inconvenient and time consuming. Furthermore, finger pressure exerted on either the right or the left side of the dispensing opening is usually ineffective in opening the duct.

In view of the deficiencies of the prior art, it is one object of the present invention to provide an improved dispensing container in which there is no tendency for parts to move out of alignment when the cap is threaded onto a container.

Another object is to provide a symmetrical valve sealing member which can be easily and quickly mounted during fabrication.

Another object is to provide an improved dispensing cap including a resilient dome, a valve sealing element and a provision for forcing the valve sealing element toward its sealing position when at rest.

A further object of the invention is the provision of an improved dispensing container including a resilient dome member which functions to force a valve element to its sealing position.

It is another object of the present invention to provide an improved dispensing container of the type described including a thin walled hemispherical dome member, a valve member connected to the dome such that the dome exerts an elevating force on the valve member and thereby pressing the valve member into sealing engagement with a dispensing duct extending through the dome.

It is another object to provide an improved dispensing container of the type described in which an increase in the air pressure within the container will cause the valve sealing element to be pressed more tightly into sealing relationship with the dispensing duct.

Another object of the invention is the provision of an improved dispensing container in which material can be dispensed by applying pressure on any part of the dome portion of the container.

These and other more detailed and specific objects will become apparent from the following description of the invention and drawings wherein:

FIGURE 1 is a perspective view of a container embodying the invention as it appears when the contents are being dispensed.

FIGURE 2 is an exploded perspective view of the dispensing cap on a somewhat larger scale than FIGURE 1.

FIGURE 3 is a view of the lower surface of the dispensing cap in accordance with the invention.

FIGURE 4 is a partial vertical sectional view of the cap on the same scale as FIGURE 3.

Figure 5:
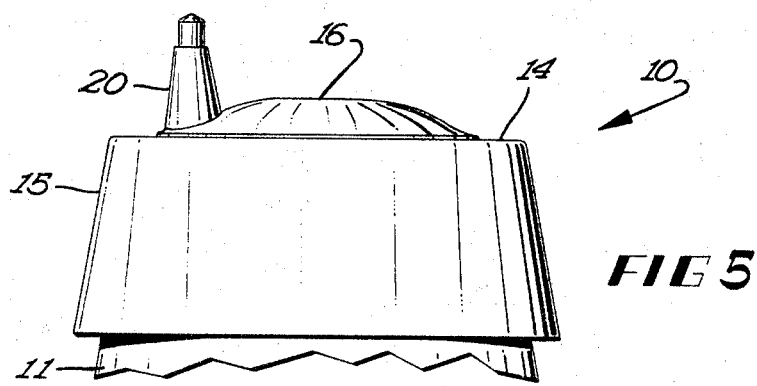
FIGURE 5 is a side elevational view of the cap on a larger scale.

Briefly stated, the present invention provides a drop dispensing cap and container that includes an enclosure which in its preferred form is a glass bottle. The bottle is secured as by threads to a cap or dispensing assembly. The dispensing assembly includes a manually movable flow control element consisting of a flexible and resilient diaphragm which is imperforate at all times. The cap also includes a valve member which is affixed to the inside center portion of the diaphragm. A dispensing duct communicates through the diaphragm with the interior of the enclosure. One end of the valve member overlaps and seals the dispensing duct. The engagement between the valve member and the duct deflects the diaphragm away from its relaxed or first position to a second valve seating position. When finger pressure is applied to the diaphragm, it is lowered to a third position in which the valve sealing element is disengaged from the dispensing duct. When released, the resiliency of the diaphragm acts both to return the valve element to its seated position and in addition it functions to force it against the open inward end of the duct.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Refer now to the FIGURES 1–6 which illustrate by way of example a preferred form of the invention. In FIGURE 1 there is shown a dispensing container 10 which in this instance is composed of a glass jar 11 having a cap 12. The glass container 11 is provided with threads at its upward end. The cap 12 includes a retaining ring 15 having internal threads 13 for securing the ring to the glass container 11. The retaining ring 15 also includes a centrally extending circular flange 14 at its upward edge.

Figure 6:
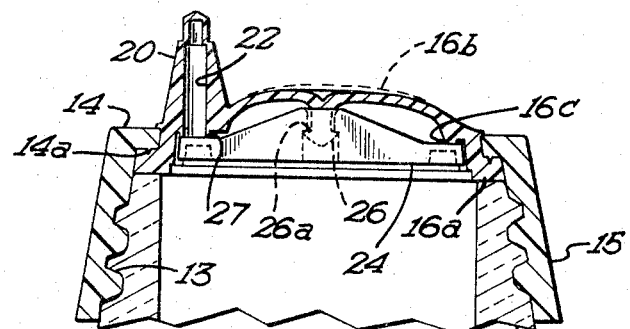
FIGURE 6 is a vertical sectional view of the cap.

Mounted below the flange 14 is a flexible and resilient dispensing element or diaphragm 16 having a generally dome-shaped outwardly convex configuration and including a central downwardly extending retaining lug 18 at its center for purposes hereinafter described. A small sealing bead 14a is provided on the lower surface of the flange 14 for reducing leakage from the container. A horizontally disposed laterally extending circular flange 16a is provided on the periphery of the diaphragm 16. A dispensing nozzle 20 is provided at one side of the diaphragm 16. The nozzle is closed at the free end when shipped as seen in FIGURE 6 and is opened by cutting off the outward end with a knife or scissors to expose a central dispensing duct 22 but the diaphragm 16 maintains the top of the container 11 otherwise closed at all times. The dispensing duct communicates at times with the interior of the container 10 when the device is in use.

Secured to the retaining lug 18 at the center of the diaphragm 16 is a valve member such as a beam member 24. The beam is provided with a central vertically disposed circular opening 25 having an annular downwardly facing shoulder 25a adapted to engage and securely lock in place an end portion 26 of the lug 18. The end portion 26 is provided with an upwardly facing annular shoulder 26a adapted to abut the shoulder 25a. To assemble the dispensing cap, the lug 18 is inserted in opening 25 and sufficient pressure is applied to force the head 26 below the shoulder 25a. The lug 18 is preferably of an appropriate length so that it must be stretched somewhat to be locked in place on shoulder 25a. As a result, the beam 24 will have no tendency to wabble about on the lug.

The beam 24 includes two identical upwardly facing sealing surfaces 24a and 24b, one of which, depending upon how the parts are assembled, normally rests against the inward end 27 of duct 22 thereby sealing the duct. The upward edge of the bottle 11 is forced by ring 15 against the lower surface of the flange 16a thereby securely sealing the container 10 against leakage when the ring 15 is screwed tightly onto the container 11. The proper orientation of the beam 24 can be accomplished in various ways as by means of a pair of opposed vertically disposed orientation recesses 28 and 29 positioned upon the inside surface of diaphragm 16 to receive either end of beam 24. Both the beam 24 and diaphragm 16 are formed from a suitable resilient material such as a synthetic resin, for example, polyethylene.

FIGURE 6 illustrates the normal position of the parts with the exception of the diaphragm 16, the center portion of which is held below its normal relaxed position indicated by a dotted line 16b due to the engagement of one end of beam 24 with the end 27 of duct 20 and the other end with a stop 16c. Thus when the container is at rest, the resiliency of diaphragm 16 acts to yieldably bias the sealing surface 24a against the opening 27.

Figure 7:
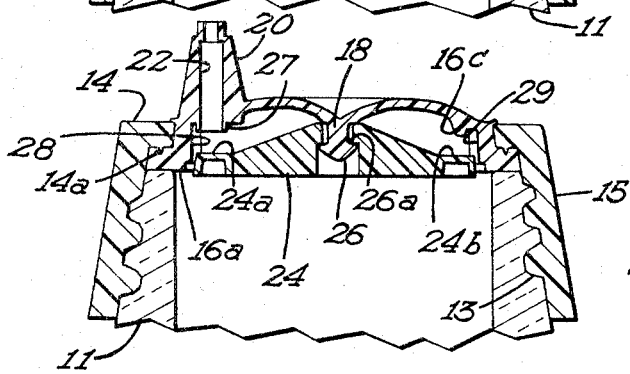
FIGURE 7 is a view similar to FIGURE 6 with the valve sealing member in a lowered position.
Figure 9:
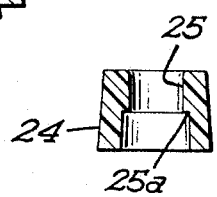
FIGURE 9 is a transverse sectional view taken on line 9—9 of FIGURE 8.
Figure 8:
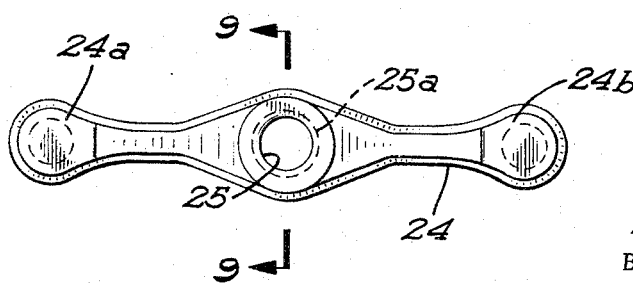
FIGURE 8 is a plan view of the valve sealing element in accordance with the invention.

When a person using the dispenser presses downwardly upon the diaphragm 16 as shown in FIGURES 1 and 7, the beam 24 is lowered sufficiently to separate the surface 24a from the opening 27. At the same time, the volume of the container is reduced and the pressure in the container is increased accordingly. With the container 10 in the inverted position of FIGURE 1, a small amount of liquid within the container is allowed to pass out through the nozzle 20. As soon as the finger pressure is released from the top of the diaphragm 16, the resiliency of diaphragm 16 will forceably elevate beam 24 to the undeflected position of FIGURE 6. Simultaneously, the upward movement of the diaphragm 16 will suck back the liquid remaining in the nozzle and enough air to equalize the pressure inside the container. The lower end 27 of duct 22 is then sealed thereby preventing further flow of material through the nozzle 20.

It can be seen that the upward pressure exerted by diaphragm 16 in attempting to reach the relaxed position 16b forces the valve member 24 against the lower end of the duct 22 thereby preventing the undesired escape of liquid from the container while the container is at rest. It was found that finger pressure exerted on one side of the diaphragm 16 will tilt the beam 24 about its longitudinal axis as shown in FIGURE 4. Accordingly, the contents can be dispensed regardless of which part of the diaphragm is pressed. It should also be noted that the decrease in volume of the container caused by the lowering of the diaphragm 16 by finger pressure helps to assure that material will be dispensed even though changes of barometric pressure have reduced the pressure within the container.

Moreover, the number of seals between ring 15 and the glass jar rim have been reduced from two in number to one. Leakage is reduced accordingly.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A drop dispensing container comprising a container body having an open end at its top defined by a rim; a maually movable, flexible and resilient diaphragm operatively sealed along its edge to the top of the container body; the diaphragm having a dispensing duct extending therethrough with its inner end terminating adjacent the open end of the container body and the diaphragm being otherwise imperforate at all times; the diaphragm having a relaxed position; a valve sealing beam positioned below the diaphragm and fixedly connected to the center portion thereof; said valve member being located adjacent the open end of the container body; said beam having a valve sealing position with a portion thereof in sealing engagement with the inner end of the duct only when the diaphragm is deflected downwardly from its relaxed position to a valve sealing position; the resiliency of the diaphragm yieldably biasing the beam toward the valve sealing position by maintaining a constant positive sealing force on the beam in the direction of the duct from a position above the inner end of the dispensing duct; further downward deflection of the diaphragm to a third position causing the beam to move away from sealing engagement with the duct and the diaphragm being adapted to move the valve member back to a position in sealing engagement with the duct upon release of the diaphragm.

2. The container according to claim 1 wherein the diaphragm includes a centrally located downwardly depending lug, said beam being provided with an opening therein, said lug extending into said opening and being locked therein to secure the beam to the diaphragm.

3. The container according to claim 1 wherein the diaphragm is provided with guide means for orienting the beam upon the diaphragm so that one end of the beam is positioned in overlapping aligned relationship with the inward end of the dispensing duct.

4. The container according to claim 1 wherein the beam comprises an elongated body element positioned beneath the diaphragm and being connected thereto, said body element including a flat, upwardly facing surface at each end thereof, one of said flat surfaces being adapted to engage and seal the inward end of the dispensing duct.

5. A drop dispensing cap comprising a manually movable, flexible and resilient diaphragm, the diaphragm having a dispensing duct extending therethrough with its inner end terminating adjacent the lower surface of the cap and the diaphragm being otherwise imperforate at all times, the diaphragm having a relaxed position, a valve sealing arm positioned below the diaphragm and fixedly connected to the center portion thereof, said arm being located adjacent the lower surface of the diaphragm, said arm having a valve sealing position with a portion thereof in sealing engagement with the inner end of the duct only when the diaphragm is deflected downwardly from its relaxed position to a valve sealing position, the resiliency of the diaphragm yieldably biasing the arm toward the valve sealing position by maintaining a constant positive sealing force on the arm in the direction of the duct from a position above the inner end of the dispensing duct, further downward deflection of the diaphragm to a third position causing the arm to move away from sealing engagement with the duct and the diaphragm being adapted to move the arm back to a position in sealing engagement with the duct upon release of the diaphragm.

6. The cap according to claim 5 wherein the diaphragm includes a centrally located downwardly depending lug, said arm being provided with an opening therein, said lug extending into said opening and being locked therein for securing the arm to the diaphragm.

7. The cap according to claim 5 wherein the diaphragm is provided with guide means for orienting the arm upon the diaphragm whereby one end of the arm will be positioned in overlapping aligned relationship with the inward end of the dispensing duct.

References Cited

UNITED STATES PATENTS

| 3,187,965 | 6/1965 | Bourget | 222—518 |
| 3,323,692 | 6/1967 | Cook | 222—422 |

SAMUEL F. COLEMAN, *Primary Examiner.*

NORMAN L. STACK, JR., *Assistant Examiner.*

U.S. Cl. X.R.

222—422, 518